(12) United States Patent
Sanchez

(10) Patent No.: US 12,682,316 B2
(45) Date of Patent: Jul. 14, 2026

(54) SYSTEMS AND METHODS FOR GENERATING AN INVENTORY OF PERSONAL POSSESSIONS OF A USER FOR INSURANCE PURPOSES

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 91 days.

(21) Appl. No.: 18/166,690

(22) Filed: Feb. 9, 2023

(65) Prior Publication Data

US 2023/0186236 A1 Jun. 15, 2023

Related U.S. Application Data

(63) Continuation of application No. 16/793,824, filed on Feb. 18, 2020, now Pat. No. 11,599,847.

(51) Int. Cl.
| | |
|---|---|
| *G06Q 40/08* | (2012.01) |
| *G06N 20/00* | (2019.01) |
| *G06Q 10/087* | (2023.01) |
| *G06Q 30/0283* | (2023.01) |

(52) U.S. Cl.
CPC ........... *G06Q 10/087* (2013.01); *G06N 20/00* (2019.01); *G06Q 30/0283* (2013.01); *G06Q 40/08* (2013.01)

(58) Field of Classification Search
CPC .. G06Q 10/087; G06Q 30/0283; G06Q 40/08; G06N 20/00
See application file for complete search history.

(56) References Cited

U.S. PATENT DOCUMENTS

| | | | |
|---|---|---|---|
| 7,107,239 B2 | 9/2006 | Graff | |
| 7,941,330 B1 | 5/2011 | Buentello et al. | |
| 8,041,636 B1 | 10/2011 | Hunter et al. | |
| 8,335,700 B2 | 12/2012 | Zizzamia et al. | |
| 8,543,430 B1 | 9/2013 | Fields et al. | |
| 9,836,792 B2 | 12/2017 | Dixon | |
| 9,836,793 B2 | 12/2017 | Busque et al. | |
| 10,176,532 B1 | 1/2019 | Hanson et al. | |

(Continued)

*Primary Examiner* — Fahd A Obeid
*Assistant Examiner* — Reva R Moore
(74) *Attorney, Agent, or Firm* — BRYAN CAVE LEIGHTON PAISNER LLP

(57) ABSTRACT

A computing system for generating a list of possessions associated with a user may be provided. The computing system may include a processor in communication with a memory device, and the processor may be configured to receive image data, analyze the image data to identify at least one possession, update a user profile to include the identified at least one possession, determine additional information is needed to accurately estimate a value associated with the at least one possession, generate and transmit an additional information prompt to a user computing device, receive, from the user computing device, the additional information, estimate, using the additional information, the value associated with the at least one possession, and update the user profile to include the estimated value associated with the at least one possession stored in association with the at least one possession.

21 Claims, 6 Drawing Sheets

(56)　　　　　References Cited

U.S. PATENT DOCUMENTS

| | | | |
|---|---|---|---|
| 10,210,577 B1 | 2/2019 | Davis et al. | |
| 10,223,750 B1 | 3/2019 | Loo et al. | |
| 10,262,375 B1 | 4/2019 | Howard | |
| 10,300,373 B2 | 5/2019 | Hickman et al. | |
| 10,311,521 B1 | 6/2019 | Capone et al. | |
| 10,339,604 B1 | 7/2019 | Cook | |
| 10,593,109 B1 | 3/2020 | Floyd | |
| 10,672,079 B1* | 6/2020 | Maurer | G06Q 30/0633 |
| 10,977,734 B1 | 4/2021 | Kenney | |
| 2002/0062249 A1* | 5/2002 | Iannacci | G06Q 30/06 |
| | | | 705/14.1 |
| 2007/0118410 A1 | 5/2007 | Nadai | |
| 2010/0044430 A1 | 2/2010 | Song et al. | |
| 2011/0066454 A1 | 3/2011 | Rosauer et al. | |
| 2011/0161117 A1* | 6/2011 | Busque | G01C 21/3461 |
| | | | 382/307 |
| 2011/0251917 A1 | 10/2011 | Etzioni et al. | |
| 2012/0253852 A1 | 10/2012 | Pourfallah et al. | |
| 2012/0323609 A1 | 12/2012 | Fini | |
| 2013/0262156 A1 | 10/2013 | Ketzef | |
| 2014/0081675 A1 | 3/2014 | Ives et al. | |
| 2014/0122134 A1 | 5/2014 | Fini | |
| 2014/0180725 A1 | 6/2014 | Ton-That et al. | |
| 2014/0278573 A1 | 9/2014 | Cook | |
| 2014/0279474 A1 | 9/2014 | Evans et al. | |
| 2015/0006206 A1 | 1/2015 | Mdeway | |
| 2015/0127430 A1* | 5/2015 | Hammer, III | G06Q 30/0206 |
| | | | 705/7.35 |
| 2015/0178851 A1 | 6/2015 | Dutt et al. | |
| 2015/0206249 A1 | 7/2015 | Fini | |
| 2016/0035038 A1 | 2/2016 | Perkins | |
| 2016/0180468 A1 | 6/2016 | Buss et al. | |
| 2016/0232615 A1 | 8/2016 | Le | |
| 2017/0323319 A1 | 11/2017 | Rattner et al. | |
| 2019/0005586 A1 | 1/2019 | Lei et al. | |
| 2019/0080325 A1 | 3/2019 | Pourfallah et al. | |
| 2020/0302322 A1* | 9/2020 | Tukiainen | G06N 3/08 |
| 2021/0090177 A1 | 3/2021 | Sears | |

* cited by examiner

SYSTEMS AND METHODS FOR GENERATING AN INVENTORY OF PERSONAL POSSESSIONS OF A USER FOR INSURANCE PURPOSES

This application is a continuation of U.S. patent application Ser. No. 16/793,824, filed Feb. 18, 2020, the entire disclosure of which is incorporated by reference herein for all purposes.

FIELD OF THE DISCLOSURE

The present disclosure relates to generating an inventory of personal possessions, and more particularly, to computer-based systems and methods using gamification to facilitate generating an inventory of personal possessions owned by a user for insurance related purposes.

BACKGROUND

Some insurance policies (e.g., renter's insurance, rental insurance, homeowner's insurance, and/or property insurance) provide coverage for loss or damage to the personal possessions of a policyholder during a policy claim (e.g., a formal request by the policyholder to an insurance provider for reimbursement for one or more personal possessions covered under an insurance policy). Loss events may include residential fires, theft, vandalism and/or other events that cause partial or complete loss of the personal possessions of the policyholder. Policy coverage is associated with the amount of risk or liability that is covered by the insurance provider for the policyholder's possessions during these loss events. Insurance providers set policy premiums based at least in part upon a number of factors including the amount of coverage that the policy provides (e.g., policy coverage or insurance coverage). In other words, the policy coverage is related to the amount of funds an insurance provider may have to pay a policyholder for damaged or lost possessions. As such, a policy coverage amount should aim to cover the amount it would cost to replace or repair each of the policyholder's personal possessions.

During a policy claim, the policyholder may submit an insurance claim request to the insurance provider, requesting reimbursement for lost or destroyed possessions. The insurance claim request may include a list of the personal possessions and values associated with the cost of replacing the personal possessions.

In some cases, the policyholder may not have created an inventory list of their personal possessions prior to the loss event. Consequentially, the policyholder may be unable to remember or identify all personal possessions that were destroyed, lost, and/or damaged. It may be particularly challenging for a policyholder to recall personal possessions in the case of a total loss, when there may be limited evidence of the policyholder's possessions (e.g. after a residential fire). As such, the policyholder may be unable to create a complete and/or accurate list of possessions for the policy claim. In other cases, a policyholder may have created an inventory list prior to the loss event, but failed to update or maintain the list such that the inventory list does not accurately reflect the most current personal possessions of the policyholder.

Further, upon receiving the policy claim request, the insurance provider may subsequently request documentation or proof from the policyholder for one or more items in the list of possessions in order to confirm that the policyholder owned the item and/or to verify the cost or value associated with the item. Requested documentation may include images of the items, receipts, or authentication documentations such as titles, certifications of authenticity, or any other documentation that can be used to verify the value associated with the possessions. In some cases, the policyholder may be unable to provide documentation supporting the claimed lost items. For example, in some cases, the policyholder's documents may have been lost or destroyed during the loss event. In other cases, the policyholder may not have kept or recorded documentation for every personal possession.

Insurance premiums, coverage rates, and insurance claims may depend on the list of policyholder's possessions owned by the policyholder. It would be advantageous for both the policyholder and the insurance provider to generate and update a complete and accurate list of personal possessions. The inventory of personal possessions should further include a cost or value assigned to each possession in the inventory of personal possessions, and documentation of the ownership and/or the value associated with the possessions. More specifically, the inventory of personal possessions may aid the insurance provider in determining policy rates and additionally aid the policyholder in determining the amount of coverage they will need. Further, during a policy claim, the inventory list may be used to determine reimbursement amounts for each possession.

BRIEF SUMMARY

The present embodiment may relate to systems and methods for generating a list of personal possessions of a user.

In one embodiment, a computer system for generating a list of items (e.g., possessions) associated with a user is provided. The computing system may include one processor in communication with at least one memory device, and the at least one processor may be configured to (i) receive image data including at least one possession of the user, (ii) analyze the image data to identify the at least one possession, (iii) update a user profile associated with the user to include the identified at least one possession, (iv) determine, from the image data, additional information is needed to accurately estimate a value associated with the at least one possession, (v) generate and transmit an additional information prompt to a user computing device associated with the user, the additional information prompt configured to cause the user computing device to prompt the user for the additional information, (vi) receive, from the user computing device, the additional information, (vii) estimate, using the additional information, the value associated with the at least one possession, and (viii) update the user profile to include the estimated value associated with the at least one possession stored in association with the at least one possession. The computer system may include additional, less, or alternate functionality, including that discussed elsewhere herein.

In another embodiment, a computer-implemented method for generating a list of items associated with a user using a computer system including at least one processor in communication with at least one memory device is provided. The method may include (i) receiving image data including at least one possession of the user, (ii) analyzing the image data to identify the at least one possession, (iii) updating a user profile associated with the user to include the identified at least one possession, (iv) determining, from the image data, additional information is needed to accurately estimate a value associated with the at least one possession, (v) generating and transmitting an additional information prompt to a user computing device associated with the user, the additional information prompt configured to cause the user computing device to prompt the user for the additional information, (vi) receiving, from the user computing device, the additional information, (vii) estimating, using the additional information, the value associated with the at least one possession, and (viii) updating the user profile to include the estimated value associated with the at least one possession stored in association with the at least one possession. The method may include additional, less, or alternate actions, including those discussed elsewhere herein.

In yet another embodiment, at least one non-transitory computer-readable media having computer-executable instructions thereon is provided, wherein when executed by at least one processor of a computer system, may cause the at least one processor to (i) receive image data including at least one possession of the user, (ii) analyze the image data to identify the at least one possession, (iii) update a user profile associated with the user to include the identified at least one possession, (iv) determine, from the image data, additional information is needed to accurately estimate a value associated with the at least one possession, (v) generate and transmit an additional information prompt to a user computing device associated with the user, the additional information prompt configured to cause the user computing device to prompt the user for the additional information, (vi) receive, from the user computing device, the additional information, (vii) estimate, using the additional information, the value associated with the at least one possession, and (viii) update the user profile to include the estimated value associated with the at least one possession stored in association with the at least one possession. The instructions may direct additional, less, or alternate functionality, including that discussed elsewhere herein.

Depending upon embodiment, one or more benefits may be achieved. These benefits and various additional objects, features and advantages of the present invention can be fully appreciated with reference to the detailed description and accompanying drawings that follow.

Figure 1:
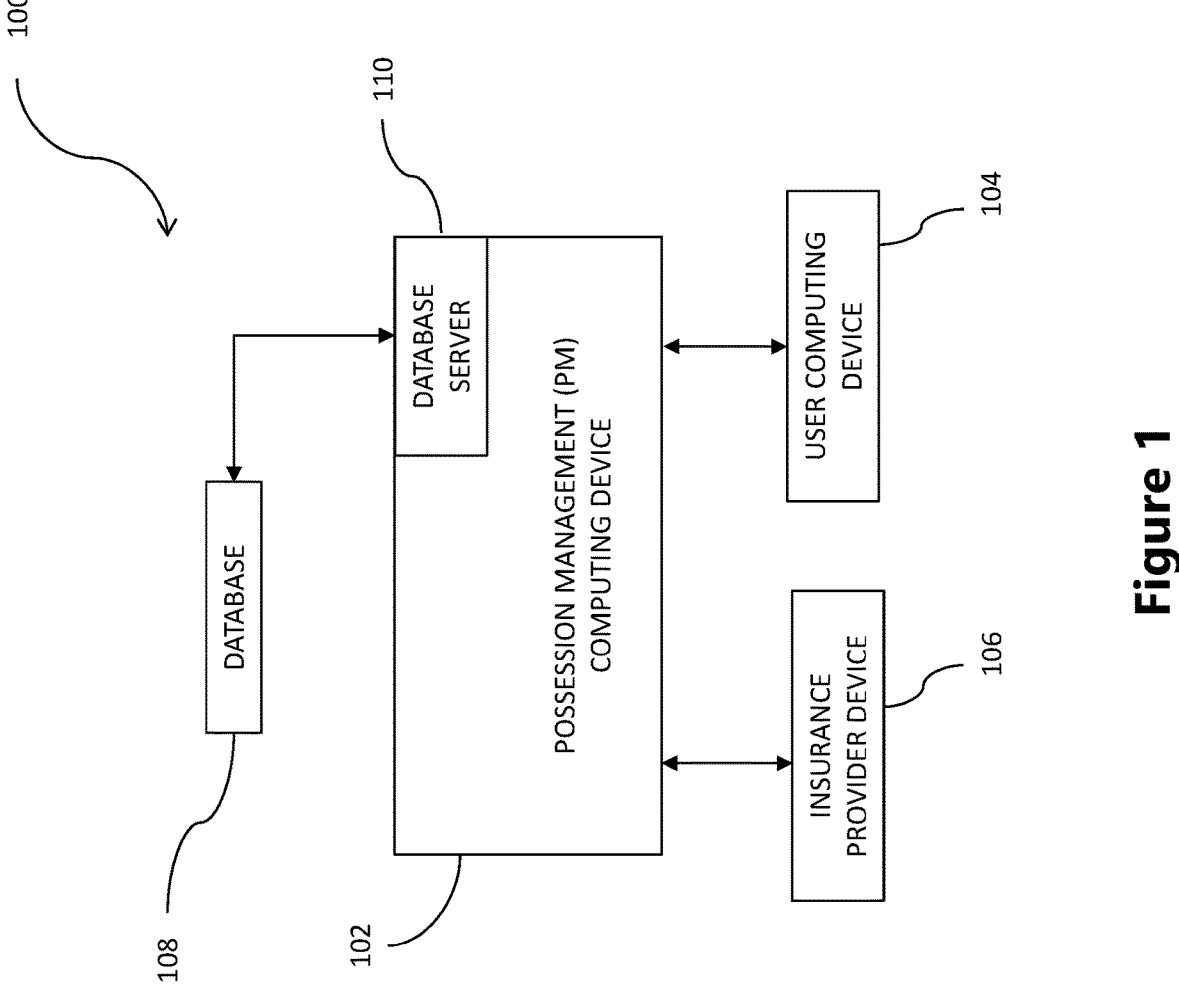
FIG. 1 illustrates a simplified block diagram of an exemplary possession management (PM) computer system.

The Figures depict preferred embodiments for purposes of illustration only. One skilled in the art will readily recognize from the following discussion that alternative embodiments of the systems and methods illustrated herein may be employed without departing from the principles of the disclosure.

DETAILED DESCRIPTION OF THE DRAWINGS

The present embodiments may relate to, inter alia, systems and methods for generating a list of personal possessions of a user (also referred to herein as items of a user) based at least in part upon image data. The list (also referred to herein as an inventory and a set) may be used in determining an insurance premium and/or policy for the user. In one exemplary embodiment, the systems and methods may be associated with and/or performed by a possession management ("PM") computing device (also referred to herein as a PM server, a PM computing system, and a PM computer system), and the PM computing device may be associated with an insurance provider.

The systems and methods described herein may generate a list of personal possessions associated with a user based at least in part upon image data, and the list of personal possessions may be used for insurance purposes (e.g., renter's insurance, rental insurance, homeowner's insurance, and/or property insurance that provide insurance coverage of personal property). More specifically, a policyholder operating a user computing device may be prompted to acquire, using the user computing device, image data of one or more possessions that the policyholder owns. For example, the policyholder may be prompted to acquire image data of one or more possessions located at the policyholder's home. In the embodiments described herein, image data acquired using the user computing device may include static images and/or video.

The PM computing device may analyze the acquired image data (e.g., using artificial intelligence and/or machine learning) to identify the one or more possessions included in the image data. Further, the PM computing device may attempt to accurately estimate a value associated with the one or more identified possessions (e.g., using image recognition, artificial intelligence, and/or machine learning). If the PM computing device needs additional information to accurately estimate the value associated with the one or more identified possessions (e.g., items that are determined to likely be relatively expensive), the PM computing device may prompt the policyholder to provide additional information regarding the one or more identified possessions. The identified possessions and their estimated values may be stored in a database in association with the policyholder.

In the embodiments described herein, the PM computing device may also issue rewards (e.g., redeemable points, coupons, discounts, etc.) to the policyholder based at least in part upon the additional information and/or estimated value associated with the one or more identified possessions. Further, the PM computing device may also cause a digital character (e.g., a personalized emoji or avatar) to be displayed on the user computing device based at least in part upon the one or more identified possessions. For example, the digital character may resemble the policyholder, may be shown wearing one or more pieces of clothing included in the one or more identified possessions, and/or may be shown with one or more items (e.g., a bicycle) included in the one or more identified possessions. Accordingly, the rewards and/or digital character incentivize the policyholder to document their possessions for insurance purposes.

Examples of Registration and Image Data Acquisition

In the exemplary embodiment, the user computing device may transmit a registration to the PM computing device that indicates that a user (e.g., the policyholder) wishes to enroll in a possession management service associated with the PM computing device. The registration may include a set of personal data (e.g., user data) associated with the user. The personal data may include demographic data (e.g., age, gender, education, employer, occupation, location of residency, number of rooms in residency, square footage of residency, etc.). Based at least in part upon the registration, the PM computing device may generate and store a policyholder profile in the database.

In this exemplary embodiment, in response to receiving the registration, the PM computing device may transmit a prompt to the user computing device that prompts the policyholder to acquire image data. In some embodiments, the prompt may include a software application that is downloaded and installed onto the user computing device, the software application usable to acquire the image data. Further, the policyholder may use the software application to manage rewards and/or view digital characters. Alternatively, the prompt may be a message (e.g., an e-mail) that includes a hyperlink to a web application that enables the user to acquire the image data, manage rewards, and/or view digital characters, as described herein. In response to the prompt, the policyholder may operate the user computing device to acquire image data of at least one possession. The image data may include static image data and/or dynamic image data (e.g., a video stream). The image data may be transmitted from the user computing device to the PM computing device as an image data message. In some embodiments, the image data message is received at the PM computing device from a device other than the user computing device. For example, the PM computing device may receive the image data message from a smart home computing device communicatively coupled to and capable of controlling one or more additional devices (e.g., thermostats, appliances, lights, etc.).

Examples of Identifying and Estimating Value of Personal Possessions

In this exemplary embodiment, the PM computing device may analyze the image data in the image data message to identify the at least one possession. The PM computing device may use image recognition, artificial intelligence, and/or machine learning to identify the at least one possession. Each identified possession may be stored in the database in the associated policyholder profile.

Further, in the exemplary embodiment, the PM computing device may attempt to accurately estimate the value associated with the identified at least one possession (e.g., using artificial intelligence and/or machine learning). For example, if the PM computing device determines the identified at least one possession may be relatively valuable, the PM computing device may determine additional information is needed to accurately estimate the value associated with the identified at least one possession. Accordingly, in such scenarios, the PM computing device may transmit an additional information prompt to the user computing device.

The additional information prompt may prompt the user to provide additional information regarding the identified at least one possession. For example, the additional information prompt may prompt the user to answer one or more questions regarding the possession, and/or may prompt the user to provide other product information regarding the possession. The additional information collected may be transmitted from the user computing device to the PM computing device as an additional information message.

In the exemplary embodiment, using the additional information in the additional information message, the PM computing device may accurately estimate the value associated with the identified at least one possession, and may store the estimated value for each identified object in the database.

Examples of Rewards and Digital Characters

In this exemplary embodiment, the PM computing device may generate and send a results message to the user computing device. The results message may be generated based at least in part upon the identified at least one possession, the value associated with the identified at least one possession, and/or the additional information provided regarding the identified at least one possession. In some embodiments, the results message may include one or more rewards (e.g., redeemable points, coupons, discounts, etc.). For example, the amount or value associated with the rewards may be proportional to and/or representative of the amount of additional information provided and/or the estimated value associated with the identified at least one possession.

Additionally or alternatively, the results message may include digital character information that controls how a digital character (e.g., a personalized emoji or an avatar) is displayed on the user computing device. The digital character may generally resemble the policyholder, and the appearance of the digital character (e.g., hair color, eye color, skin tone) may be controlled using a digital character creation interface provided via the installed software application and/or the web application. The results message may cause the digital character to be displayed in association with the identified at least one possession. In another example, points included in the rewards may be redeemed to alter the displayed digital character (e.g., by displaying additional items with the digital character and/or providing additional options for customizing the digital character). The rewards and/or displayed digital character incentivize the user to acquire image data and provide additional information, as described herein.

Examples of Generating Insurance Policies and Insurance Claims

In some embodiments, the actual inventory of personal possessions may be used to set a rate for an insurance premium. The set of personal possessions and estimated values may be used to predict the cost of a total loss (e.g., the sum of the values for each possession or in some cases, the sum the upper range of acceptable values). For example, a user wishing to obtain insurance coverage for personal possessions owned by the user may use the PM system to generate an actual inventory of the personal possessions and the estimated values associated with the personal possessions. The inventory may be used by an insurance company (e.g., which may be associated with the PM system) to decide on an insurance premium that covers the personal possessions.

Further, the inventory of personal possession may be used to generate a complete and accurate inventory of personal possessions of a user (e.g., a policyholder) who already has an insurance policy covering the personal possessions. For example, in a claim event (e.g., a fire, robbery, natural disaster, etc.), the user may need to generate an actual inventory of personal possessions associated with the user for the insurance claim. If the user has not maintained an inventory of personal possessions and the personal possessions were damaged in the claim event, the user may utilize the PM system to determine an inventory of personal possessions.

At least one technical problems addressed by this system may include: (i) inability of the user to easily create an inventory of personal possessions owned by the user, (ii) inability to confirm the value or ownership of personal possession of a user, and (iii) inability to receive adjustments from a user for values assigned to possessions in an inventory of personal possessions.

The methods and systems described herein may be implemented using computer programming or engineering techniques including computer software, firmware, hardware, or any combination thereof, where the technical effect may be achieved by performing at least one of the following steps: (i) receiving image data including at least one possession of the user, (ii) analyzing the image data to identify the at least one possession, (iii) updating a user profile associated with the user to include the identified at least one possession, (iv) determining, from the image data, additional information is needed to accurately estimate a value associated with the at least one possession, (v) generating and transmitting an additional information prompt to a user computing device associated with the user, the additional information prompt configured to cause the user computing device to prompt the user for the additional information, (vi) receiving, from the user computing device, the additional information, (vii) estimating, using the additional information, the value associated with the at least one possession, and (viii) updating the user profile to include the estimated value associated with the at least one possession stored in association with the at least one possession.

At least one technical solution addressed by this system may include: (i) enable a user, an insurance provider, and the PM system to generate and update an accurate set of personal possessions associated with the user, (ii) determine the inventory of personal possessions based at least in part upon minimal input from the user, and (iii) prompt users to provide documentation of ownership of personal possessions only in rare instances (e.g., when the value associated with the personal possessions is likely relatively high) user.

Exemplary Computer Networks

FIG. 1 depicts an exemplary possession management (PM) system 100 that may be used in generating a list of items predicted to be associated with a user. In the exemplary embodiment, PM system 100 may include a possession management (PM) computing device 102.

In the exemplary embodiment, PM computing device 102 is in communication with a user computing device 104 and an insurance provider device 106. PM computing device 102 is also in communication with a database 108 and may communicate with database 108 through a database server 110. In some embodiments, database server 110 is a component of PM computing device 102. In other embodiments, database server 110 is separate from PM computing device 102. In the illustrated embodiment, insurance provider device 106 is separate from PM computing device 102. In other embodiments, PM computing device 102 may be a component of insurance provider device 106. In some embodiments, PM system 100 may include a plurality of PM computing devices 102, user computing devices 104, insurance provider devices 106, and/or databases 108.

In the exemplary embodiment, user computer device 104 may be computers that include a web browser or a software application, which enables user computer device 104 to access remote computer devices, such as PM computing device 102, using the Internet or other network. More specifically, user computer device 104 may be communicatively coupled to PM computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User computer device 104 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, user computer device 104 may be associated with a user (e.g., a user 302 shown in FIG. 3).

Insurance provider device 106 may be communicatively coupled with PM computing device 102. In some embodiments, insurance provider device 106 may be associated with, or is part of a computer network associated with an insurance provider, or in communication with a computer network of an insurance provider. In other embodiments, insurance provider device 106 may be associated with a third party and is merely in communication with the computer network of the insurance provider. More specifically, insurance provider device 106 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance provider device 106 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 110 may be communicatively coupled to a database 108. In one embodiment, database 108 may store a plurality of policyholder profiles. Each policyholder profile may include a set of personal data associated with the personal data of the policyholders. In addition, each policyholder may include a set of personal possessions owned by the policyholder (e.g., as included in an insurance policy). The stored set of personal possessions may be generated using the system and methods described herein. In the exemplary embodiment, database 108 may be stored remotely from the PM computing device 102. In some exemplary embodiments, the insurance provider may access database 108 via insurance provider device 106 by logging into PM computing device 102, as described herein.

Exemplary Processes for Generating an Inventory List of Personal Possessions

Figure 2:
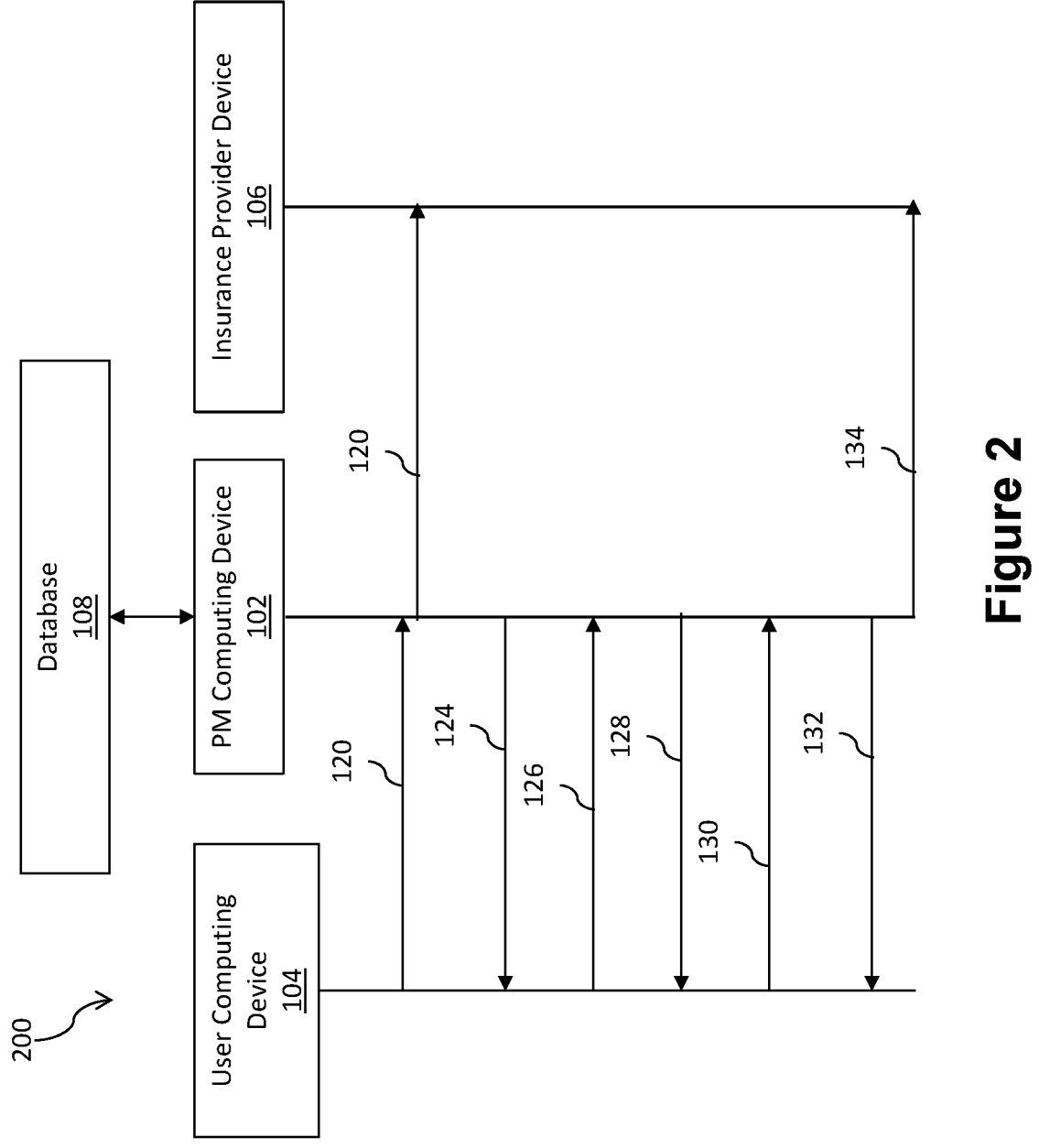
FIG. 2 is a schematic diagram illustrating an exemplary process that may be performed by the PM computer system shown in FIG. 2.

FIG. 2 is a flow diagram of a process 200 that is associated with PM system 100 (shown in FIG. 1) for generating a list of possessions associated with a selected user.

In this exemplary embodiment, a policyholder operating user computing device 104 may be prompted to acquire, using user computing device 104, image data of one or more possessions that the policyholder owns. For example, the policyholder may be prompted to acquire image data of one or more possessions located at the policyholder's home. In the embodiments described herein, image data acquired using user computing device 104 may include static image data and/or dynamic image data (e.g., video data).

PM computing device 102 may analyze the acquired image data (e.g., using artificial intelligence and/or machine learning) to identify the one or more possessions included in the image data. Further, PM computing device 102 may attempt to accurately estimate a value associated with the one or more identified possessions (e.g., using image recognition, artificial intelligence, and/or machine learning). If PM computing device 102 needs additional information to accurately estimate the value associated with the one or more identified possessions, PM computing device 102 may prompt the policyholder (via user computing device 104) to provide additional information regarding the one or more identified possessions. The identified possessions and their estimated values may be stored in database 108 in association with the policyholder.

In the embodiments described herein, PM computing device 102 may also issue rewards (e.g., redeemable points, coupons, discounts, etc.) to the policyholder based at least in part upon the additional information and/or estimated value associated with the one or more identified possessions. Further, PM computing device 102 may also cause a digital character (e.g., a personalized emoji or avatar) to be displayed on user computing device 104 based at least in part upon the one or more identified possessions. For example, the digital character may resemble the policyholder, may be shown wearing one or more pieces of clothing included in the one or more identified possessions, and/or may be shown with one or more items (e.g., a bicycle) included in the one or more identified possessions. Accordingly, the rewards and/or digital character incentivize the policyholder to document their possessions for insurance purposes.

In the exemplary embodiment, user computing device 104 may transmit a registration 120 to PM computing device 102. Registration 120 may indicate that a user (e.g., the policyholder) wishes to enroll in a possession management service associated with PM computing device 102 (e.g., a service that enables the policyholder to document their possessions using the systems and methods described herein). Registration 120 may include a set of personal data (e.g., user data) associated with the user. The personal data may include demographic data (e.g., age, gender, education, employer, occupation, location of residency, number of rooms in residency, square footage of residency, etc.). Registration 120 may be transmitted from PM computing device 102 to insurance provider device 106. In other embodiments, registration 120 may be transmitted directly from user computing device 104 to insurance provider device 106. Based at least in part upon registration 120, PM computing device 102 may generate and store a policyholder profile in database 108.

In this exemplary embodiment, in response to receiving registration 120, PM computing device 102 may transmit a prompt 124 to user computing device 104 that prompts the policyholder to acquire image data using user computing device 104. In some embodiments, prompt 124 may include a software application that is downloaded and installed onto user computing device 104. In such embodiments, the policyholder may use the software application to acquire the image data. Further, the policyholder may use the software application to manage rewards and/or view digital characters, as described in detail below. Alternatively, prompt 124 may be a message (e.g., an e-mail) that includes a hyperlink to a web application (e.g., hosted on PM computing device 102). In such embodiments, the policyholder may use the web application to acquire the image data, manage rewards, and/or view digital characters, as described herein.

In response to prompt 124, the policyholder may operate user computing device 104 to acquire image data of at least one possession. As noted above, the image data may include static image data and/or dynamic image data (e.g., a video stream). The image data may be transmitted from user computing device 104 to PM computing device 102 as an image data message 126.

In some embodiments, image data message 126 is received at PM computing device 102 from a device other than user computing device 104. For example, PM computing device 102 may be communicatively coupled to a smart home computing device (not shown) that is communicatively coupled to and capable of controlling one or more additional devices (e.g., thermostats, appliances, lights, etc.). The smart home computing device may automatically acquire image data using sensors on the one or more additional devices and transmit the acquired image data to PM computing device in image data message 126.

In this exemplary embodiment, PM computing device 102 may analyze the image data in image data message 126 received from user computing device 104 to identify the at least one possession. PM computing device 102 may use image recognition, artificial intelligence, and/or machine learning to identify the at least one possession. Each identified possession may be stored in database 108 in the associated policyholder profile.

Further, PM computing device 102 may attempt to accurately estimate the value associated with the identified at least one possession (e.g., using artificial intelligence and/or machine learning). For example, if PM computing device 102 determines the identified at least one possession may be relatively valuable, PM computing device 102 may determine additional information is needed to accurately estimate the value associated with the identified at least one possession. Accordingly, PM computing device 102 may transmit an additional information prompt 128 to user computing device 104.

Additional information prompt 128 may prompt the user to provide additional information regarding the identified at least one possession. For example, if the identified possession is a bicycle, additional information prompt 128 may prompt the user to answer one or more questions regarding the bicycle (e.g., "How long have you owned the bicycle?", "Is the bicycle in working condition?", "What brand is the bicycle?", etc.). The additional information prompt 128 may also prompt the user to provide other product information regarding the possession (e.g., "Please scan the serial number of your bicycle", "please provide documentation indicating the purchase price of the bicycle", etc.). The additional information may be received by user computing device 104 from the policyholder by detecting manual inputs on user computing device 104 (e.g., touchscreen or button inputs), capturing audio of the policyholder (e.g., using natural language processing), etc. The additional information collected may be transmitted from user computing device 104 to PM computing device 102 as an additional information message 130.

Using the additional information in additional information message 130, PM computing device 102 may accurately estimate the value associated with the identified at least one possession. The estimated value for each identified object may be stored in database 108 in association with the identified object in the associated policyholder profile.

In this exemplary embodiment, PM computing device 102 may generate and send a results message 132 to user computing device 104. Results message 132 may be generated based at least in part upon the identified at least one possession, the value associated with the identified at least one possession, and/or the additional information provided regarding the identified at least one possession. In some embodiments, results message 132 may include one or more rewards (e.g., redeemable points, coupons, discounts, etc.). For example, the amount or value associated with the rewards may be proportional to and/or representative of the amount of additional information provided and/or the estimated value associated with the identified at least one possession.

Additionally or alternatively, results message 132 may include digital character information that controls how a digital character (e.g., a personalized emoji or an avatar) is displayed on user computing device 104. The digital character may be displayed via the software application installed on the user computing device 104 and/or via the web application accessed using the user computing device 104. Further, the digital character may generally resemble the policyholder, and the appearance of the digital character (e.g., hair color, eye color, skin tone) may be controlled using a digital character creation interface provided via the installed software application and/or the web application. Results message 132 may cause the digital character to be displayed in association with the identified at least one possession. For example, the digital character may be displayed in clothing included in the identified at least one possession, next to a bicycle included in the at least identified possession, etc. In another example, points included in the rewards may be redeemed to alter the displayed digital character (e.g., by displaying additional items with the digital character and/or providing additional options for customizing the digital character). The rewards and/or displayed digital character incentivize the user to acquire image data and provide additional information, as described herein.

In this exemplary embodiment, based at least in part upon the possessions and estimated values stored in the policyholder profile, PM computing device 102 may generate and transmit a finalized inventory 134 (e.g., an actual inventory) to user computing device 104 for the policyholder's records. Finalized inventory 134 may include a set of finalized personal possessions and associate values. PM computing device 102 may also transmit finalized inventory 134 to insurance provider device 106. In some cases, insurance provider device 106 may use the set of finalized personal possessions to determine, for example and without limitation, an insurance premium or rate and/or insurance coverage amounts. In some cases, insurance provider device 106 may transmit an insurance policy message (not shown) to user computing device 104. The insurance policy message may include a proposed insurance policy including coverage details and/or policy rates or fees. In some other cases, PM computing device 102 may transmit the insurance policy message to user computing device 104.

Exemplary Policyholder Devices

Figure 3:
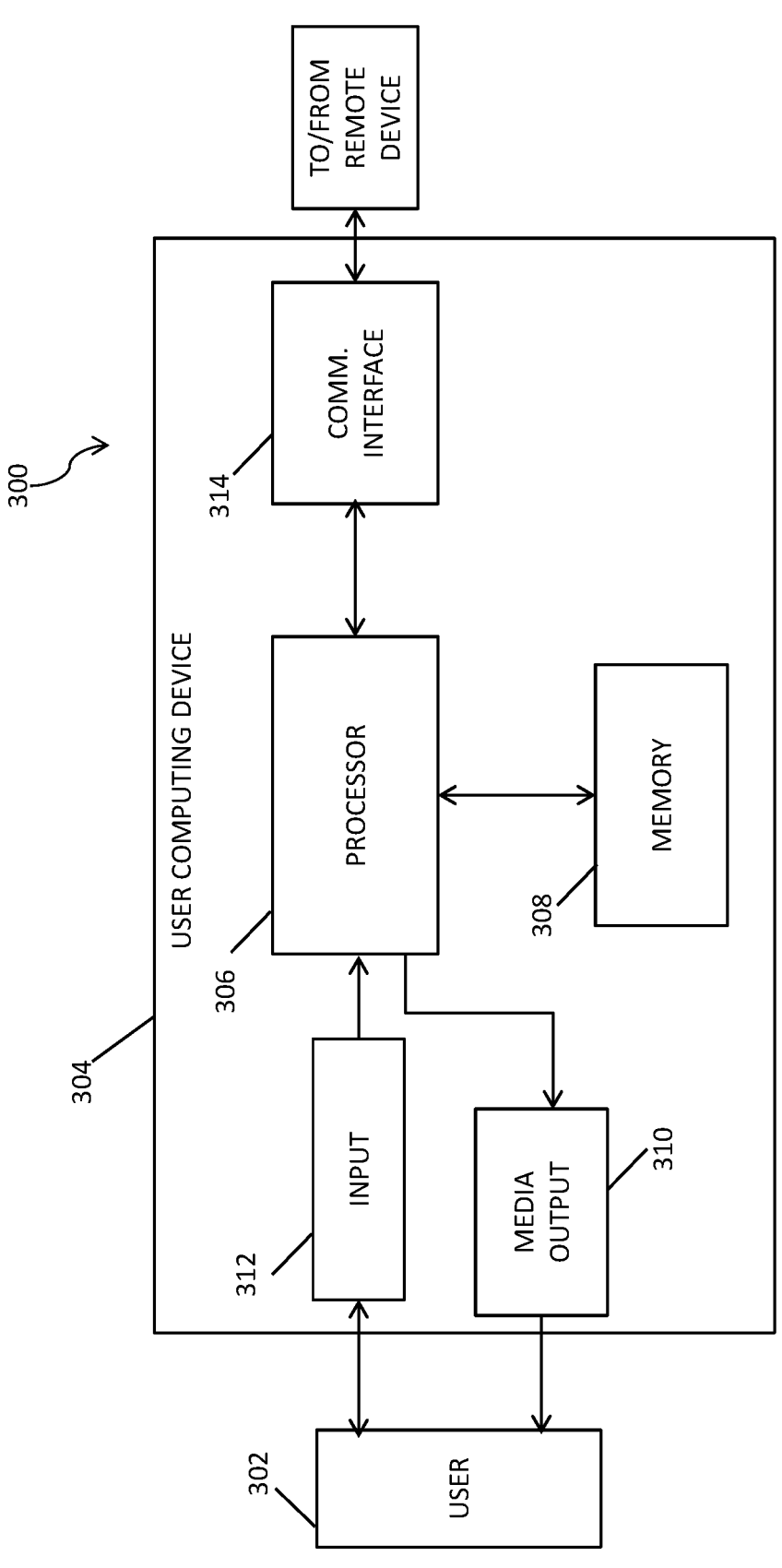
FIG. 3 illustrates an exemplary configuration of a user computer device that may be used with the PM computer system shown in FIG. 1.

FIG. 3 depicts an exemplary configuration 300 of a user computing device 304 (e.g., user computing device 104, shown in FIG. 1 and FIG. 2), in accordance with one embodiment of the present disclosure. User computing device 304 may be operated by a user 302 (e.g., the policyholder). User computing device 304 may include, but is not limited to, user computing device 104 and insurance provider device 106 (all shown in FIG. 1). User computing device 304 may include a processor 306 for executing instructions. In some embodiments, executable instructions may be stored in a memory 308. Processor 306 may include one or more processing units (e.g. in a multi-core configuration). Memory 308 may be any device allowing information such as executable instructions and/or transaction data to be stored and retrieved. Memory 308 may include one or more computer readable media.

User computing device 304 may also include one media output component 310 for presenting information to user 302. Media output component 310 may be any component capable of conveying information to user 302. In some embodiments, media output component 310 may include an output adapter (not shown) such as a video adapter and/or an audio adapter. An output adapter may be operatively coupled to processor 306 and operatively coupleable to an output device such as a display device (e.g. a cathode ray tube (CRT), liquid crystal display (LCD), light emitting diode (LED) display, or "electronic ink" display) or an audio output device (e.g. a speaker or headphones).

In some embodiments, media output component 310 may be configured to present a graphical user interface (e.g. a web browser and/or a client application) to user 302. A graphical user interface may include, for example, an online store interface for viewing and/or interacting with inventories, requests, documentation, etc. (shown in FIG. 2). In some embodiments, User computing device 304 may include an input device 312 for receiving input from user 302. User 302 may use input device 312 to, without limitation, update and/or adjust inventories and provide documentation.

Input device 312 may include, for example, a keyboard, a pointing device, a mouse, a stylus, a touch sensitive panel (e.g. a touch pad or a touch screen), a gyroscope, an accelerometer, a position detector, a biometric input device, and/or an audio input device. A single component such as a touch screen may function as both an output device of media output component 310 and input device 312.

User computing device 304 may also include a communication interface 314, communicatively coupled to a remote device such as PM computing device 102 (shown in FIG. 3). Communication interface 314 may include, for example, a wired or wireless network adapter and/or a wireless data transceiver for use with a mobile telecommunications network.

Stored in memory 308 are, for example, computer readable instructions for providing a user interface to user 302 via media output component 310 and, optionally, receiving and processing input from input device 312. A user interface may include, among other possibilities, a web browser and/or a client application. Web browsers enable users, such as user 302, to display and interact with media and other information typically embedded on a web page or a website from PM computing device 102. A client application may allow user 302 to interact with, for example, PM computing device 102. For example, instructions may be stored by a cloud service, and the output of the execution of the instructions sent to the media output component 310.

Exemplary Server Devices

Figure 4:
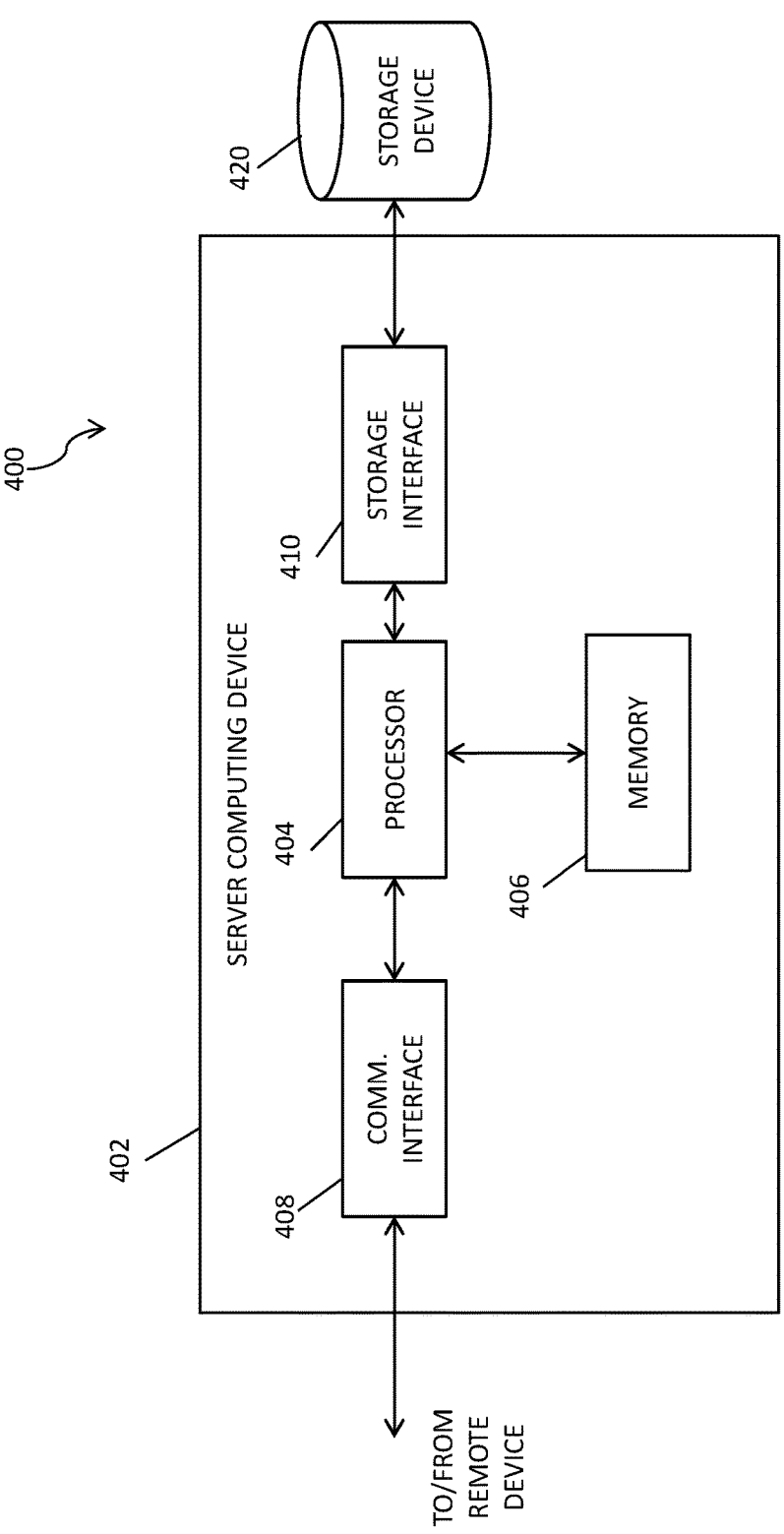
FIG. 4 illustrates an exemplary configuration of a server system that may be used with the PM computer system shown in FIG. 1.

FIG. 4 depicts an exemplary configuration 400 of server system, in accordance with one embodiment of the present disclosure. Server computing device 402 may include, but is not limited to, PM computing device 102 (shown in FIG. 1). Server computing device 402 may also include a processor 404 for executing instructions. Instructions may be stored in a memory area 406. Processor 404 may include one or more processing units (e.g. in a multi-core configuration).

Processor 404 may be operatively coupled to a communication interface 408 such that server computing device 402 is capable of communicating with a remote device such as another server computing device 402, PM computing device 102, insurance provider device 106, and user computing device 104 (shown in FIG. 1).

Processor 404 may also be operatively coupled to a storage device 420. Storage device 420 may be any computer-operated hardware suitable for storing and/or retrieving data, such as, but not limited to, data associated with database 108 (shown in FIG. 1). In some embodiments, storage device 420 may be integrated in server computing device 402. For example, server computing device 402 may include one or more hard disk drives as storage device 420.

In other embodiments, storage device 420 may be external to server computing device 402 and may be accessed by a plurality of server computing devices 402. For example, storage device 420 may include a storage area network (SAN), a network attached storage (NAS) system, and/or multiple storage units such as hard disks and/or solid state disks in a redundant array of inexpensive disks (RAID) configuration.

In some embodiments, processor 404 may be operatively coupled to storage device 420 via a storage interface 410. Storage interface 410 may be any component capable of providing processor 404 with access to storage device 420. Storage interface 410 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 420.

Figure 5:
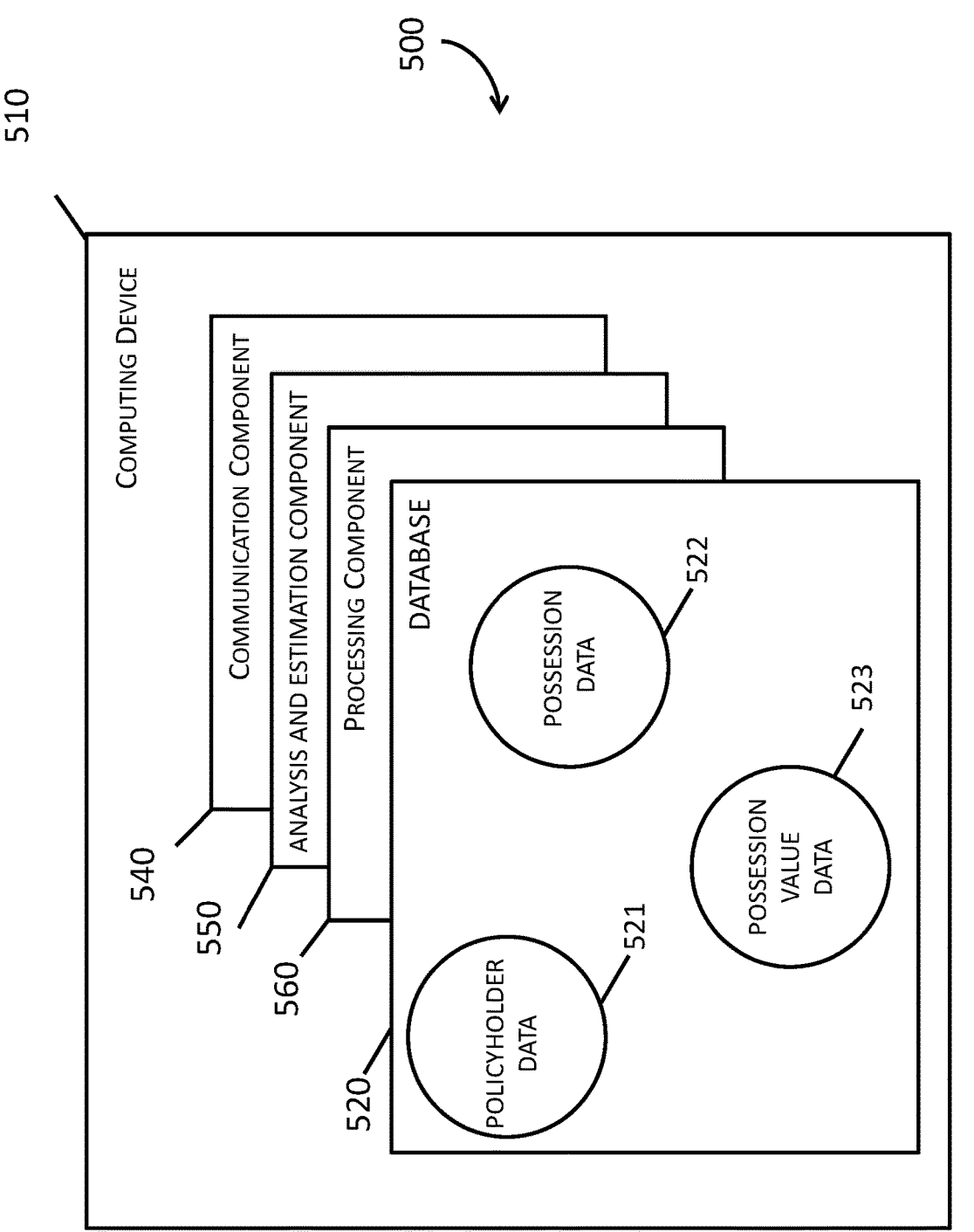
FIG. 5 illustrates a diagram of components of one or more exemplary computing devices that may be used in the PM computer system shown in FIG. 1.

Processor 404 may execute computer-executable instructions for implementing aspects of the disclosure. In some embodiments, the processor 404 may be transformed into a special purpose microprocessor by executing computer-executable instructions or by otherwise being programmed.
Exemplary Computer Devices FIG. 5 depicts a diagram 500 of components of one or more exemplary computing devices 510 that may be used in PM system 100 (shown in FIG. 1). In some embodiments, computing device 510 may be similar to PM computing device 102 (shown in FIG. 1). Database 520 may be coupled with several separate components within computing device 510, which perform specific tasks. In this embodiment, database 520 may include policyholder data 521, possession data 522, and possession value data 523. In some embodiments, database 520 is similar to database 108 (shown in FIG. 1).

Figure 6:
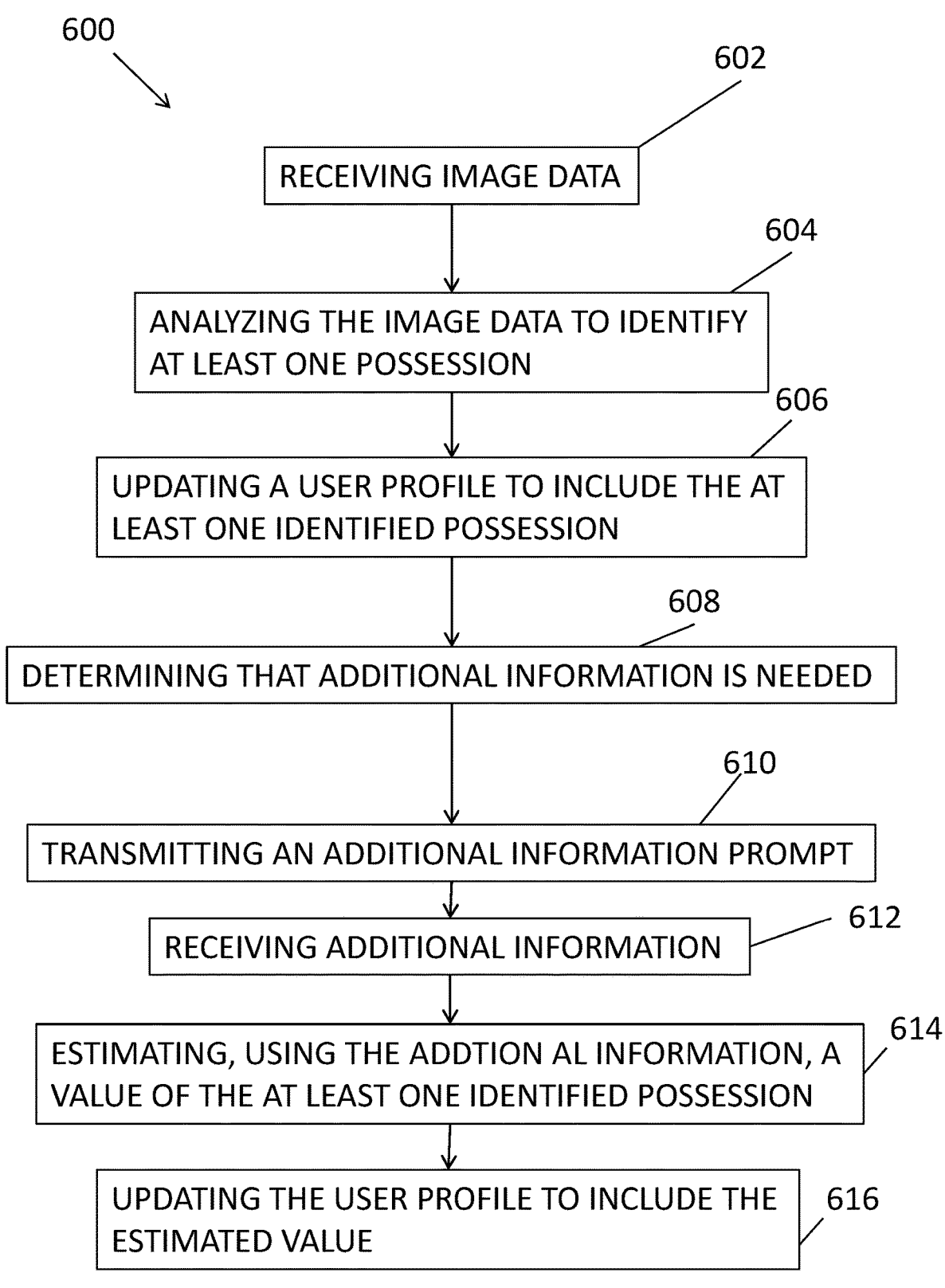
FIG. 6 illustrates a flow chart of an exemplary computer-implemented process for generating an inventory of personal possessions that may be carried out by the PM computer system shown in FIG. 1.

Computing device 510 may include database 520, as well as data storage devices (not shown). Computing device 510 may also include a communication component 540 for interacting with and/or prompting a user. Computing device 510 may further include analysis and estimation component 550 for analyzing image data to identify possessions and for estimating a value of identified possessions. Moreover, computing device 510 may include processing component 560 for receiving and transmitting data, such as registration 120, prompt 124, image data message 126, additional information prompt 128, additional information message 130, results message 132, and finalized inventory 134. Computing device 510 may include additional, less, or alternate functionality, including that discussed elsewhere herein.
Exemplary Computer-Implemented Methods for Generating an Inventory of Personal Possessions FIG. 6 illustrates a flow chart of an exemplary computer implemented method 600 for generating a list of items associated with a user. Method 600 may be carried out by PM system 100 (shown in FIG. 1), and more specifically, may be carried out by a processor (e.g., processor 404 shown in FIG. 4) of PM system 100.

In the exemplary embodiment, method 600 may include receiving 602 image data including at least one possession of the user. Method 600 may further include analyzing 604 the image data to identify the at least one possession, and updating 606 a user profile associated with the user to include the identified at least one possession.

In the exemplary embodiment, method 600 may further include determining 608, from the image data, additional information is needed to accurately estimate a value associated with the at least one possession. Further, method 600 may include generating and transmitting 610 an additional information prompt to a user computing device associated with the user, the additional information prompt configured to cause the user computing device to prompt the user for the additional information.

Method 600 may further include receiving 612, from the user computing device, the additional information, and estimating 614, using the additional information, the value associated with the at least one possession. Further, method 600 may include updating 616 the user profile to include the estimated value associated with the at least one possession stored in association with the at least one possession.

Exemplary Embodiments & Functionalities

In one embodiment, a computer system for generating a list of items pre associated with a user may be provided. The computing system may include one processor in communication with at least one memory device, and the at least one processor may be configured to (i) receive image data including at least one possession of the user, (ii) analyze the image data to identify the at least one possession, (iii) update a user profile associated with the user to include the identified at least one possession, (iv) determine, from the image data, additional information is needed to accurately estimate a value associated with the at least one possession, (v) generate and transmit an additional information prompt to a user computing device associated with the user, the additional information prompt configured to cause the user computing device to prompt the user for the additional information, (vi) receive, from the user computing device, the additional information, (vii) estimate, using the additional information, the value associated with the at least one possession, and (viii) update the user profile to include the estimated value associated with the at least one possession stored in association with the at least one possession. The computer system may include additional, less, or alternate functionality, including that discussed elsewhere herein.

To determine additional information is needed, the at least one processor may be configured to determine additional information is needed using at least one of machine learning and artificial intelligence. Further, to receive image data, the at least one processor is configured to receive the image data from the user computing device.

The at least one processor may further be configured to generate and transmit a results message to the user computing device, the results message generated based at least in part upon at least one of the identified at least one possession, the estimated value associated with the identified at least one possession, and the additional information. The results message may include one or more rewards having a value proportional to at least one of an amount associated with the additional information and the estimated value associated with the identified at least one possession. Further, the results message may cause a digital character to be displayed on the user computing device, the digital character displayed in association with the identified at least one possession.

The at least one processor may further be configured to generate and transmit a final inventory to an insurance provider device based at least in part upon the estimated value associated with the at least one possession.

In another embodiment, a computer-implemented method for generating a list of items associated with a user using a computer system including at least one processor in communication with at least one memory device may be provided. The method may include (i) receiving image data including at least one possession of the user, (ii) analyzing the image data to identify the at least one possession, (iii) updating a user profile associated with the user to include the identified at least one possession, (iv) determining, from the image data, additional information is needed to accurately estimate a value associated with the at least one possession, (v) generating and transmitting an additional information prompt to a user computing device associated with the user, the additional information prompt configured to cause the user computing device to prompt the user for the additional information, (vi) receiving, from the user computing device, the additional information, (vii) estimating, using the additional information, the value associated with the at least one possession, and (viii) updating the user profile to include the estimated value associated with the at least one possession stored in association with the at least one possession. The method may include additional, less, or alternate actions, including those discussed elsewhere herein.

In yet another embodiment, at least one non-transitory computer-readable media having computer-executable instructions thereon may be provided, wherein when executed by at least one processor of a computer system, may cause the at least one processor to (i) receive image data including at least one possession of the user, (ii) analyze the image data to identify the at least one possession, (iii) update a user profile associated with the user to include the identified at least one possession, (iv) determine, from the image data, additional information is needed to accurately estimate a value associated with the at least one possession, (v) generate and transmit an additional information prompt to a user computing device associated with the user, the additional information prompt configured to cause the user computing device to prompt the user for the additional information, (vi) receive, from the user computing device, the additional information, (vii) estimate, using the additional information, the value associated with the at least one possession, and (viii) update the user profile to include the estimated value associated with the at least one possession stored in association with the at least one possession. The instructions may direct additional, less, or alternate functionality, including that discussed elsewhere herein.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs. For example, models may be created based at least in part upon historical image data and possession value data to identify at least one possession in received image data and to determine whether additional information is needed to accurate estimate a value associated with the identified at least one possession.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing— either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs. In one embodiment, machine learning techniques may be used to extract data about the computer device, the user of the computer device, driver and/or vehicle, home owner and/or home, renter, geolocation information, image data, home sensor data, and/or other data.

Based at least in part upon these analyses, the processing element may learn how to identify characteristics and patterns that may then be applied to analyzing sensor data, authentication data, image data, mobile device data, and/or other data. For example, the processing element may learn, with the user's permission or affirmative consent, to identify new possessions in updated image data and determine whether additional information is needed to accurately estimate a value of those possessions.

Examples of Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g. an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g. magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without needing a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system may include multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computing system for generating a list of possessions associated with a user, the computing system including at least one processor in communication with at least one memory device, the at least one processor configured to:

send, over a communication interface, a control signal to a smart home device associated with the user to automatically acquire image data including at least one possession of the user, using one or more sensors of the smart home device, wherein the smart home device is separate from the at least one processor and is configured to control one or more smart home devices to automatically acquire one or more images;

analyze the image data to identify the at least one possession by applying a trained convolutional neural network to generate, for each detected possession of the at least one possession, a class label, a bounding region, and a confidence score, and to identify the at least one possession based on the confidence score exceeding a threshold;

when the confidence score for a detected possession does not exceed the threshold, determine that additional image data is needed and send a further control signal to the smart home device to automatically acquire the additional image data using the one or more sensors;

receive the additional image data and reanalyze the additional image data using the trained convolutional neural network to identify a possession;

generate and transmit an additional information prompt to a user device for additional information, the additional information comprising one or more text documents including one or more of an authentication document, an ownership document, or a receipt;

receive, from the user device, the additional information;

estimate, using the additional information and the identified possession, a value associated with the identified possession; and store the identified possession and the estimated value in a policyholder profile in a database.

2. The computing system of claim 1, wherein the at least one processor is further configured to generate a first reward that includes a discount, a coupon, one or more points, or one or more points to be used to modify a digital character.

3. The computing system of claim 1, wherein the additional information prompt includes a software application to acquire at least a part of the additional information.

4. The computing system of claim 1, wherein the at least one processor is further configured to generate a results message to the user device, the results message generated based at least in part upon the identified possession, the estimated value associated with the identified possession, and the additional information.

5. The computing system of claim 4, wherein the results message includes a first reward and a second reward, the second reward having a value proportional to the estimated value associated with the identified possession.

6. The computing system of claim 4, wherein the results message is configured to cause a digital character to be displayed on the user device in association with the identified possession.

7. The computing system of claim 1, wherein the at least one processor is further configured to generate a final inventory to an insurance provider device based at least in part upon the estimated value associated with the identified possession.

8. A computer-implemented method for generating a list of possessions associated with a user, the method implemented on a computer device including at least one processor in communication with at least one memory device, the computer-implemented method comprising:

sending, over a communication interface, a control signal to a smart home device associated with the user to automatically acquire image data including at least one possession of the user, using one or more sensors of the smart home device, wherein the smart home device is separate from the at least one processor and is configured to control one or more smart home devices to automatically acquire one or more images;

analyzing the image data to identify the at least one possession by applying a trained convolutional neural network to generate, for each detected possession of the at least one possession, a class label, a bounding region, and a confidence score, and to identify the at least one possession based on the confidence score exceeding a threshold;

when the confidence score for a detected possession does not exceed the threshold, determining that additional image data is needed and sending a further control signal to the smart home device to automatically acquire the additional image data using the one or more sensors;

receiving the additional image data and reanalyzing the additional image data using the trained convolutional neural network to identify a possession;

generating and transmitting an additional information prompt to a user device for additional information, the additional information comprising one or more text documents including one or more of an authentication document, an ownership document, or a receipt;

receiving, from the user device, the additional information;

estimating, using the additional information and the identified possession, a value associated with the identified possession; and storing the identified possession and the estimated value in a policyholder profile in a database.

9. The computer-implemented method of claim 8, further comprising generating a first reward that includes a discount, a coupon, one or more points, or one or more points to be used to modify a digital character.

10. The computer-implemented method of claim 8, wherein the additional information prompt includes a software application to acquire at least a part of the additional information.

11. The computer-implemented method of claim 8, further comprising generating a results message to the user device, the results message generated based at least in part upon the identified possession, the estimated value associated with the identified possession, and the additional information.

12. The computer-implemented method of claim 11, wherein the results message includes a first reward and a second reward, the second reward having a value proportional to the estimated value associated with the identified possession.

13. The computer-implemented method of claim 11, wherein the results message is configured to cause a digital character to be displayed on the user device in association with the identified possession.

14. The computer-implemented method of claim 8, further comprising generating a final inventory to an insurance provider device based at least in part upon the estimated value associated with the identified possession.

15. One or more non-transitory computer-readable media having computer-executable instructions thereon, wherein when executed by at least one processor of a computing device, cause the at least one processor to:

send, over a communication interface, a control signal to a smart home device associated with a user to automatically acquire image data including at least one possession of the user, using one or more sensors of the smart home device, wherein the smart home device is separate from the at least one processor and is configured to control one or more smart home devices to automatically acquire one or more images;

analyze the image data to identify the at least one possession by applying a trained convolutional neural network to generate, for each detected possession of the at least one possession, a class label, a bounding region, and a confidence score, and to identify the at least one possession based on the confidence score exceeding a threshold;

when the confidence score for a detected possession does not exceed the threshold, determine that additional image data is needed and send a further control signal to the smart home device to automatically acquire the additional image data using the one or more sensors;

receive the additional image data and reanalyze the additional image data using the trained convolutional neural network to identify a possession;

generate and transmit an additional information prompt to a user device for additional information, the additional information comprising one or more text documents including one or more of an authentication document, an ownership document, or a receipt;

receive, from the user device, the additional information;

estimate, using the additional information and the identified possession, a value associated with the identified possession; and store the identified possession and the estimated value in a policyholder profile in a database.

16. The one or more non-transitory computer-readable media of claim 15, wherein the at least one processor is further configured to generate a first reward that includes a discount, a coupon, one or more points, or one or more points to be used to modify a digital character.

17. The one or more non-transitory computer-readable media of claim 15, wherein the additional information prompt includes a software application to acquire at least a part of the additional information.

18. The one or more non-transitory computer-readable media of claim 15, further causing the at least one processor to generate a results message to the user device, the results message generated based at least in part upon the identified possession, the estimated value associated with the identified possession, and the additional information.

19. The one or more non-transitory computer-readable media of claim 18, wherein the results message includes first reward and a second reward, the second reward having a value proportional to the estimated value associated with the identified possession.

20. The one or more non-transitory computer-readable media of claim 18, wherein the results message is configured to cause a digital character to be displayed on the user device in association with the identified possession.

21. A system for generating a list of possessions associated with a user, comprising:

a means for storing data thereon; and a means for performing operations comprising:

sending, over a communication interface, a control signal to a smart home device associated with the user to automatically acquire image data including at least one possession of the user, using one or more sensors of the smart home device, wherein the smart home device is separate from the means for performing operations and is configured to control one or more smart home devices to automatically acquire one or more images;

analyzing the image data to identify the at least one possession by applying a trained convolutional neural network to generate, for each detected possession of the at least one possession, a class label, a bounding region, and a confidence score, and to identify the at least one possession based on the confidence score exceeding a threshold;

when the confidence score for a detected possession does not exceed the threshold, determining that additional image data is needed and sending a further control signal to the smart home device to automatically acquire the additional image data using the one or more sensors;

receiving the additional image data and reanalyzing the additional image data using the trained convolutional neural network to identify a possession;

generating and transmitting an additional information prompt to a user device for additional information, the additional information comprising one or more text documents including one or more of an authentication document, an ownership document, or a receipt;

receiving, from the user device, the additional information;

estimating, using the additional information and the identified possession, a value associated with the identified possession; and storing the identified possession and the estimated value in a policyholder profile in a database.

* * * * *